Patented May 23, 1939

2,159,375

UNITED STATES PATENT OFFICE 2,159,375

MAKING LOW VISCOSITY CELLULOSE ETHERS

Richard D. Freeman and Martin J. Roberts, Midland, Mich., assignors to The Dow Chemical Company, Midland, Mich., a corporation of Michigan No Drawing. Application July 19, 1938, Serial No. 220,132

7 Claims. (Cl. 260—231)

This invention relates to a method for the production of stable, low viscosity cellulose ethers, and particularly to a method whereby a low viscosity cellulose may be prepared which is suitable for etherification to form such ethers.

Viscosity data herein are, in the case of cellulose, reported in two different forms. By the expression "1 per cent viscosity" is meant the viscosity of cellulose as measured on a 1 per cent solution by weight thereof in a cuprammonium hydroxide reagent containing 15 grams of copper and 200 grams ammonia per liter. The expression "3 per cent viscosity" refers to a viscosity measurement on a 3 per cent solution of the cellulose in a cuprammonium reagent containing 30 grams of copper and 200 grams of ammonia per liter. Viscosity measurements relating to cellulose ethers are reported herein based on determination at 25° C. on 5 per cent solutions by weight of the cellulose ether in a solvent consisting of 80 parts of toluene and 20 parts of ethanol, by volume.

It has long been desired to obtain stable cellulose ethers having low intrinsic viscosity, and more especially such ethers which have viscosities lower than 20 centipoises. In the case of ethyl cellulose it has been desired to produce a material having a viscosity in the range from about 5 to about 10 centipoises. Cellulose ethers in this viscosity range are not common, and such ethers as have been prepared falling in the above-defined viscosity range have been unsatisfactory for many purposes owing to their instability toward heat and light or because of their brittleness which makes them inapplicable to a variety of possible commercial uses for such materials. Lower alkyl ethers of cellulose, among the most important of which is ethyl cellulose, have occasionally been prepared within the above-mentioned desired viscosity range by methods involving either aging of the alkali cellulose prior to etherification or reducing the viscosity of a cellulose ether by degradation of its molecule with acid, both processes producing ethyl cellulose in low yields. The process involving long time aging of alkali cellulose at elevated temperatures results invariably in the production of a large proportion of oxidation products in the alkali cellulose which cannot be etherified to produce a uniform, stable cellulose ether. The processes involving degradation of the cellulose ether molecule by means of acid hydrolysis have resulted invariably in a relatively unstable and brittle cellulose ether product.

It has long been known that the intrinsic solution viscosity of cellulose can be reduced by treating cellulose with dilute aqueous mineral acids such as hydrochloric, sulphuric, or sulphurous acids. The use of concentrated mineral acids for this purpose has been avoided as far as possible because the effect of such acids is not limited to a reduction of the viscosity characteristics of the cellulose, but goes much further, producing in the end a completely water-soluble glucose material. The use of dilute acids has its disadvantages as well. Such acids can be removed from cellulose only with difficulty and their effect upon the viscosity of the cellulose continues for considerable time after the cellulose has been removed from the acid bath. If not carefully controlled, the dilute mineral acids can saccharify cellulose as well as the more concentrated acids. Both dilute and concentrated mineral acids, and the aqueous vapors of such acids, have been used to reduce the viscosity of cellulose which has then been nitrated while still wet to form low viscosity nitrocellulose. To etherify cellulose, however, an alkali cellulose of certain specific water and alkali content must first be formed. Treatment of cellulose with aqueous acids leaves too much water in the fiber aggregate to prepare the preferred type of alkali cellulose, unless dried, and drying may result in injurious degradation.

The use of aqueous solutions of sulphur dioxide, i. e. sulphurous acid, for bleaching cellulose pulp has long been practiced. It has also been suggested to use sulphur dioxide gas as a reducing agent with which to treat cellulose after a moist cellulosic aggregate has been bleached with chlorine. The use of sulphur dioxide gas in treating cellulose has heretofore been limited to that mentioned above or to the mild bleaching action which this agent exerts on kraft pulp and the like.

It is an object of the present invention to provide a convenient process for producing low viscosity cellulose adapted to the direct production of low viscosity alkali cellulose and thence stable, low viscosity cellulose ethers without employing an aqueous acid, and without requiring aging of the alkali cellulose or subsequent acid degradation of the cellulose ether. Other objects and advantages of the invention will appear as the description proceeds.

We have now found that the foregoing objects may be attained by subjecting an air-dry cellulosic aggregate to the action of anhydrous sulphur dioxide, converting the so-formed low viscosity cellulose to alkali cellulose and immediately etherifying the alkali cellulose.

In a preferred mode of carrying out the invention, a sheet or other aggregate of cellulose fibers, either from wood pulp or cotton, is exposed for a suitable period to the action of sulphur dioxide to saturate the moisture in the cellulose therewith. When the air-dry cellulose, which ordinarily contains less than 10 per cent residual moisture based on the weight of cellulose present, has become saturated with sulphur dioxide, it is placed in a closed aging chamber where the sulphur dioxide and cellulose remain in contact with one another for a period varying from a few hours to several days, e. g. about 5 hours to 5 days or more, depending both upon the desired extent of viscosity reduction and upon the temperature of the aging operation. For many purposes, a satisfactory low viscosity cellulose having a 1 per cent viscosity below about 10 centipoises, from which stable low viscosity cellulose ethers may be prepared, can be obtained by aging the sulphur dioxide-impregnated cellulose at about 100° C. for from 10 to 30 hours. The temperature of the aging operation may be varied suitably up to about 125° C. We have found that the duration of the aging treatment to accomplish a particular viscosity reduction will vary inversely as the temperature employed. For example, the 1 per cent viscosity of a particular lot of cellulose could be reduced to about 8 centipoises by aging the sulphur dioxide-impregnated mass at about 100° C. for 20 hours. The same viscosity could likewise be obtained by aging at room temperature for about 5 to 6 days.

We have found that it is necessary to supply only sufficient sulphur dioxide to the air-dry cellulose to saturate the residual moisture in the cellulose with sulphur dioxide. Since the action of sulphur dioxide is considerably slower than that of hydrogen chloride when similarly employed, as described in our concurrently filed co-pending application Serial No. 220,134, the treatment is more readily controlled so as to yield a cellulose product of any desired viscosity type between the viscosity of the original untreated cellulose and a 1 per cent viscosity value of about 4 to 5 centipoises. We prefer to reduce the original 1 per cent viscosity of the cellulose by at least one-half. The viscosity reduction may be stopped at any desired point by removing the cellulose from the aging chamber and cooling it to room temperature. If it is desired to store the cellulose for a considerable period prior to converting it into reaction products, it is advisable to neutralize the remaining sulphur dioxide. The neutralization step may conveniently be accomplished by subjecting the cellulose to the action of anhydrous ammonia in an amount at least equivalent to the remaining sulphur dioxide. The cellulose is thus stabilized against further viscosity change on long standing, and is still substantially dry. If, however, the cellulose may be etherified soon after the aging treatment, no special neutralization is required, since the action of sulphur dioxide is very slow at room temperature. In such a case the low viscosity cellulose is converted to alkali cellulose suitable for etherification and immediately etherified, thus avoiding injurious oxidation of the cellulose molecule, which result ordinarily accompanies any process wherein alkali cellulose is aged prior to etherification. When our low viscosity cellulose has been treated with a suitable alkali and etherified, there is obtained a stable, low viscosity cellulose ether.

The following example illustrates our invention but is not to be construed as limiting the same:

Several 1.5 to 2 pound rolls of air-dry cellulose pulp, in a thin sheet form and containing about 5 per cent residual moisture based on the weight of cellulose, were arranged loosely in a stainless steel drum with a tight fitting cover. Sulphur dioxide gas was introduced through a tube reaching to the bottom of the drum. When most of the air had been displaced, the drum was sealed and placed in an oven at 100° to 105° C. where it remained for 20 hours, after which the cellulose was removed, cooled, exposed to the air for a short period to permit volatilization of any excess sulphur dioxide, and tested to determine its viscosity. The 1 per cent viscosity of the original cellulose was 28 centipoises. The sulphur dioxide-treated material had a 1 per cent viscosity of 6.2 centipoises and a 3 per cent viscosity of 56 centipoises.

A sample of the so-treated cellulose was converted to alkali cellulose having an alkali:cellulose ratio of 2.2:1 and a water:cellulose ratio of 0.6:1. The alkali cellulose was prepared in a manner similar to that described by Collings et al. in a co-pending application Serial Number 144,374, filed May 24, 1937 (U. S. Patent 2,145,862), as follows: A sheet of the low viscosity sulphur dioxide-treated cellulose was conveyed into and through a bath of sodium hydroxide of about 78 per cent concentration, the bath being maintained at a temperature of about 95° to 100° C. so as to keep the alkali in the liquid state. The period of immersion of the cellulose in the alkali bath was about 15 seconds, i. e. just sufficient to wet the cellulose uniformly with the alkali solution. The cellulose emerging from the alkali bath contained 2.8 times its own weight of the sodium hydroxide solution. The so-formed alkali cellulose was shredded for a period of about 10 minutes, i. e. just sufficient to produce a uniform state of fine subdivision, and was immediately etherified. A sample of the alkali cellulose taken just prior to etherification was tested and found to have a 3 per cent viscosity of 13 centipoises, or a 1 per cent viscosity of 4.2 centipoises. The alkali cellulose was converted to ethyl cellulose by reacting with an excess of ethyl chloride for about 8 hours at a temperature of about 115° C.

The resulting ethyl cellulose had a viscosity of 11.4 centipoises and an ethoxyl content of 45 per cent. When films of the ethyl cellulose were deposited from a mixture of toluene and ethanol, they were found to have a tensile strength of 468 kilograms per square centimeter of original cross section and to be capable of elongation to the extent of 4.8 per cent. This was a remarkably strong product when its low viscosity is considered. When a foil of the ethyl cellulose was heated to 120° C. for 16 hours, and thereafter redissolved to form a standard solution for viscosity determination in the toluene-ethanol mixture, it was found to have retained 100 per cent of its original viscosity.

By way of comparison, some of the original untreated cellulose was converted directly to alkali cellulose and the latter was aged to reduce the 1 per cent viscosity to about 4–5 centipoises. This alkali cellulose was ethylated under conditions similar to those employed when etherifying the gas-treated cellulose, and the resulting ethyl cellulose had a tensile strength of only 246 kilograms per square centimeter, an elongation of 1.3 per cent, and was too brittle for commercial acceptance.

The herein-described process, then, provides a means whereby the intrinsic viscosity of cellulose may be reduced without affecting the stability of the cellulose molecule. The low viscosity cellulose obtained by the herein-described sulphur dioxide treatment may be converted into alkali cellulose and thence into low viscosity cellulose ethers which have greater tensile strength and are capable of greater elongation than are cellulose ethers of similar viscosities prepared by the heretofore known processes.

The process has the advantage of providing an accurate method of controlling the reduction of cellulose viscosities owing to the slowness of the reaction of anhydrous sulphur dioxide on air-dry cellulose as compared with the rate of viscosity reduction when using other acidic compounds or when acting upon moist or wet cellulose. As a further advantage, it may be pointed out that sulphur dioxide, being a reducing agent, prevents the formation of undesirable oxidation products during the viscosity reduction step and therefore the formation of alkali cellulose and its subsequent etherification are accompanied by less degradation than is observed when the viscosity of cellulose is reduced by the action of strong alkalies during the aging of alkali cellulose.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. The process which comprises subjecting an air-dry cellulose to the action of gaseous sulphur dioxide in quantity sufficient to saturate the said residual moisture in the cellulose, and aging the so-treated cellulose in the presence of sulphur dioxide gas, whereby the intrinsic solution viscosity of the cellulose is substantially reduced.

2. The process which comprises subjecting an air-dry cellulose to the action of gaseous sulphur dioxide in quantity sufficient to saturate the said residual moisture in the cellulose, and aging the so-treated cellulose in the presence of sulphur dioxide gas until the 1 per cent viscosity of the cellulose is reduced by at least one-half.

3. The process which comprises the steps of saturating the residual moisture in an aggregate of air-dry cellulose with gaseous sulphur dioxide, and heating the so-impregnated cellulose in a closed vessel until the 1 per cent viscosity thereof is below about 10 centipoises.

4. The process which comprises the steps of saturating the residual moisture in an aggregate of air-dry cellulose with gaseous sulphur dioxide, and heating the so-impregnated cellulose in an atmosphere of dry sulphur dioxide to a temperature of about 100° C. for from 10 to 30 hours.

5. The process which comprises subjecting an air-dry cellulose to the action of gaseous sulphur dioxide in quantity sufficient to saturate the residual moisture in the cellulose, aging the so-treated cellulose in the presence of sulphur dioxide gas, whereby the intrinsic solution viscosity of the cellulose is substantially reduced, and neutralizing the sulphur dioxide with substantially anhydrous ammonia, whereby the cellulose is stabilized against further viscosity reduction.

6. The process which comprises subjecting an air-dry cellulose to the action of gaseous sulphur dioxide in quantity sufficient to saturate the residual moisture in the cellulose, aging the so-treated cellulose in the presence of sulphur dioxide gas, whereby the 1 per cent viscosity of the cellulose is reduced by at least one-half, converting the so-formed low viscosity cellulose to alkali cellulose, and etherifying the alkali cellulose, whereby there is formed a stable, low viscosity cellulose ether.

7. The process which comprises the steps of saturating the residual moisture in an aggregate of air-dry cellulose with anhydrous sulphur dioxide, heating the so-impregnated cellulose in an atmosphere of sulphur dioxide in a closed vessel until the viscosity of the cellulose is below about 10 centipoises, when determined on a 1 per cent solution of the cellulose in a cuprammonium reagent containing 15 grams of copper and 200 grams of ammonia per liter, converting the so-formed low viscosity cellulose to alkali cellulose, and etherifying the alkali cellulose, whereby there is formed a stable, low viscosity cellulose ether.

RICHARD D. FREEMAN.
MARTIN J. ROBERTS.